G. W. Bishop.
Channelling Stone.
No. 3,367. Reissued Apr. 13, 1869.
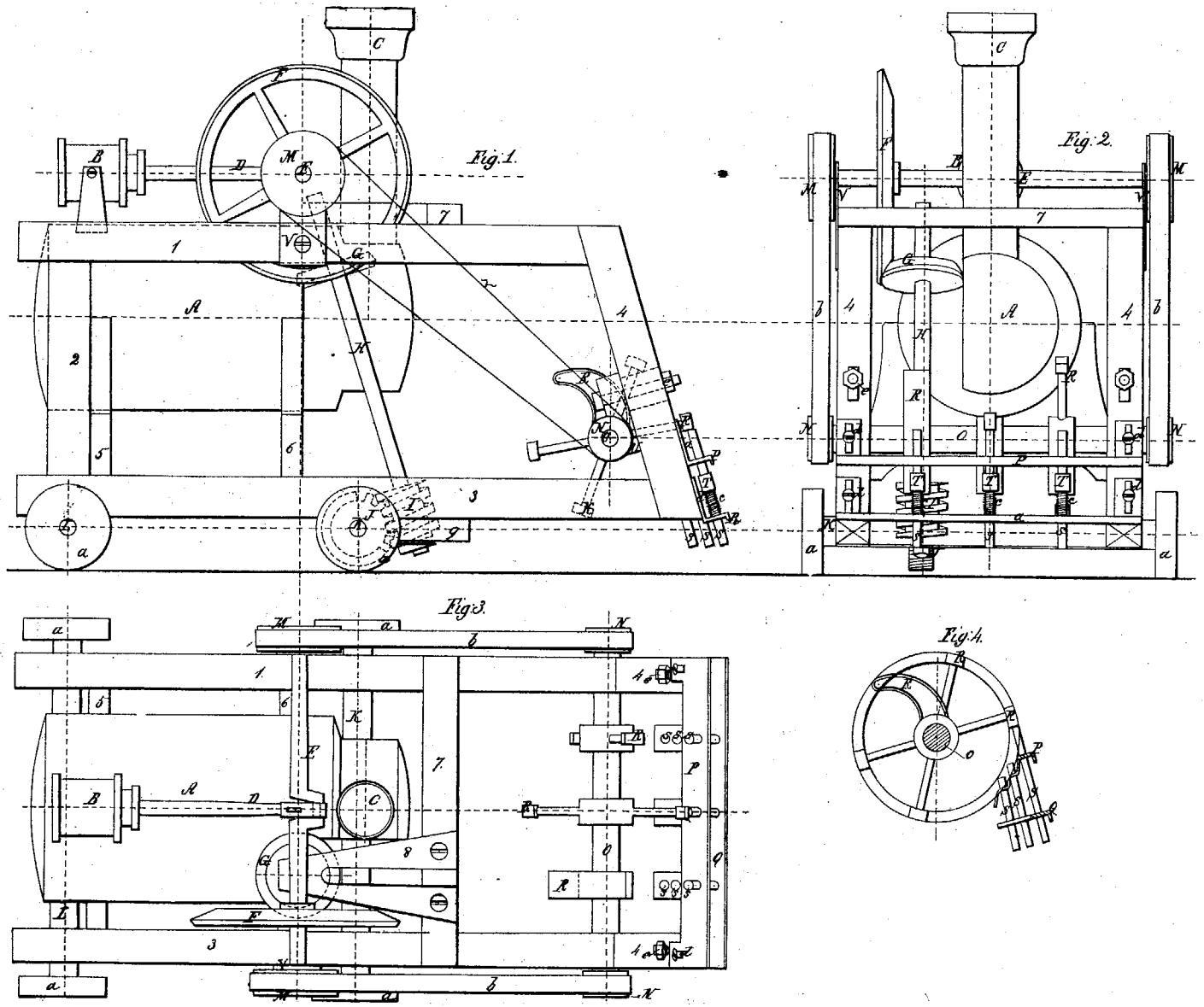
N. PETERS, PHOTO-LITHOGRAPHER, WASHINGTON, D. C.

United States Patent Office.

E. G. LAMSON, OF WINDSOR, VERMONT, ASSIGNEE OF GEORGE W BISHOP.

*Letters Patent No.* 16,460, *dated January* 27, 1857; *reissue No.* 3,367, *dated April* 13, 1869.

IMPROVED STONE-CHANNELLING MACHINE.

The Schedule referred to in these Letters Patent and making part of the same.

*To all whom it may concern:*

Be it known that GEORGE W. BISHOP, of Brooklyn, Kings county, New York, invented a new and improved Stone-Grooving Machine, for grooving pavements and other work; and that the following is a full, clear, and exact description thereof, reference being had to the accompanying drawings, figures, and letters of reference thereon, in which—

Figure 1 is a side elevation of his improved grooving-machine.

Figure 2 is a front elevation,

Figure 3 is a top view, and

Figure 4 is a vertical section of the rotating cam, hammers, and chisels, detached from the machine.

Similar letters of reference refer to like parts in all the drawings.

The nature of the invention consists in the arrangement of a frame, which carries an engine and boiler, and a drilling or cutting-apparatus, the drills or chisels operating, on either or both sides, within or without said frame; also, in providing a frame that carries an engine, boiler, and a drilling or cutting-apparatus, with a worm or spiral gear, to give motion to the same; and, also, in so arranging and combining a series of chisels that a rotating hammer may operate them all during its revolutions.

To enable others skilled in the art to make and use the invention, its construction and operation will now be described.

The figures, 1, 2, 3, 4, 5, 6, 7, 8, and 9, are parts of the frame which support various working-parts of the machinery.

A represents the boiler of an ordinary steam-engine.

B is the engine-cylinder.

C is the smoke-pipe to the boiler.

D is the connecting-rod, which is attached, in the ordinary way, to a crank-shaft, E, from which motion is imparted to the parts of the machine.

F is a bevel-gear on the crank-shaft, which drives another gear, G.

This gear G is made fast upon an upright shaft, H, on the bottom of which there is a worm-gear, I, which works a pinion on the axle K.

L is the forward axle of the machine.

M M are driving-pulleys, attached to the outer ends of the crank-shaft, which drive, by means of the belts, the rotating hammer-shaft O, by means of the pulleys N N.

P Q are the guide-plates, (through which the chisels work,) and are made adjustable, by means of the slotted ears *d d*.

R R R are the rotating cams or hammers, which strike all the chisels during the revolution of the shaft.

It will be observed that these cams or hammers are so arranged upon the shaft that only one cam or hammer is upon the chisels at a time, which arrangement contributes to the even and easy working of the machine, thereby requiring less power, which is a great advantage.

S S S are the chisels, which are plainly shown in all the figures.

These chisels are arranged with a collar, T, on them, which is made fast by means of a screw, or otherwise.

Directly below this collar T, and around the chisels, are small helical springs, *c*, which bear, at their upper ends, against the collar T, while their lower ends rest against the guide-bar Q.

The object and purpose of these springs are to react the chisels after receiving the blows from the hammers.

The revolving hammer-shaft O has its journals in sliding boxes, U, which are secured in the proper position, to give the requisite blow to the chisels, by the bolt and nut *e*, or other proper manner.

The crank-shaft is supported and has its journals in proper standards, V, attached to the frame-rails.

The shaft H has its bearings, at its upper end, in the plate 8, while the lower end rests in a cross-piece attached to the frame-work 9.

In this case is represented a series of cutters which work without the limits of the frame, but within the limits of the track upon which the frame moves; but it is perfectly evident that the cutters may be worked outside of the track, by a simple transposition of the pulleys N and M, and the cam and hammers.

Should the pulleys N and M be moved within the frame, and the cutters, with their hammers or cams, be moved to the extremities of the shaft, then could grooves be readily cut on each side of the track, and on the outside of both frame and track, and this, too, without any change whatever in construction of the machine. The guides which hold the cutters would, of course, have to be changed to the outside of the frame.

Motion being given to the crank-shaft, it imparts a motion, through the pulleys M and N, by means of the belts *b b*, to the rotary hammer-shaft, which, as it revolves, strikes the chisels singly; and, as soon as the hammers have passed the chisels, they react, by means of the helical springs, ready for another blow.

The guide-bars are set in the right position to cut deep or shallow grooves, and the hammer-shaft set to correspond for the proper blows.

On the upper end of the upright shaft H, there is a bevel-pinion, which is worked from the gear F, on the crank-shaft, while on the lower end of the shaft H is a worm-gear, which works a pinion on the rear axle, K, and, by their conjoint action, cause the machine to regularly progress forward, and a continuous feeding is had for the machine.

The feeding of the machine may be regulated, by the size of the gearing on the shaft H, to work slow or fast, at the option of the engineer.

The cams can be used instead of the hammers, or the hammers can be substituted for the cams, the cams giving a sliding or gradual motion, while the hammers give a positive motion for the chisels or drills.

It will be seen that the worm, working in the gear on the axle, turns the wheels upon any suitable track or way, and, by means of the weight of the machine resting on the track, when the wheels are turned, the friction of the wheels upon the track or way moves the machine, and thus the machine is fed at any desired speed.

The object of this friction-feed is obvious, for the reason that, when the machine, while in operation, is frequently obstructed and stopped in various ways, the wheels will turn on the track, and thus save the breaking of some part of the feed-works, whereas a positive feed would break some part of the machine.

Having thus fully described the invention,

What is claimed as new, and desired to be secured by Letters Patent, is—

1. A stone-grooving machine, upon a frame, which carries an engine, and a boiler, and a stone-channelling or grooving apparatus, with reciprocating cutters, operating in connection with the frame, substantially in the manner specified.

2. A frame which carries an engine, and boiler, and a drilling, grooving, or cutting-apparatus, when provided with a worm and spiral gear, for the purpose of giving motion to said frame, upon any suitable track or way, by means of friction, substantially as herein specified.

3. Propelling a stone-grooving or cutting machine, or a frame of a drilling, cutting, or grooving-machine, by means of a worm, spiral, and bevel-gears, which operate upon the wheels or axles which support or carry said frame, substantially as specified.

4. A series of vertical inclined chisels, of different lengths, placed, one behind the other, in combination with a revolving hammer or cam, as described, whereby a positive motion is given to all the chisels, from a single hammer or cam for each series of chisels, substantially as set forth.

5. The combination of a feed-mechanism, a stone-channelling or grooving machine, and a steam-engine, all operating substantially as and for the purposes set forth.

6. The combination of wheels having plane surfaces, and which move upon a track having a plane surface, with the frame and propelling-mechanism for drilling, channelling, or cutting stone, whereby I am enabled to feed the machine without too positive a movement, substantially as and for the purposes specified.

In testimony that I claim the foregoing, I have hereunto set my hand, this 15th day of March, 1869.

E. G. LAMSON.

Witnesses:

EDM. F. BROWN,

J. M. MASON.